United States Patent Office 3,549,657
Patented Dec. 22, 1970

3,549,657
N-ARYL-4,6-DIBROMO-3-HYDROXY-PHTHALIMIDE DERIVATIVES
Brian Webster, Kinnaird, British Columbia, Canada, assignor to Lever Brothers Company, New York, N.Y., a corporation of Maine
No Drawing. Filed June 12, 1968, Ser. No. 736,294
Claims priority, application Canada, June 17, 1967, 993,242
Int. Cl. C07d 27/52
U.S. Cl. 260—326                                   1 Claim

ABSTRACT OF THE DISCLOSURE

This disclosure relates to N-phenyl derivatives of 4,6-dibromo-3-hydroxyphthalimide and 4,6-dibromo-3-acetoxyphthalimide which possesses bacteriostatic properties against Gram positive organisms such as *Staph. aureus*. The preparation of these compounds is described.

---

This invention relates to a new class of germicidal compounds and to methods of preparing them. More particularly it relates to certain N-aryl-4,6-dibromo-3-hydroxyphthalimides and to methods for their preparation.

3-hydroxyphthalic acid and N-phenyl-3-hydroxyphthalimide are known compounds, but neither of them posses bacteriostatic properties against Gram positive organisms such as *Staphylococcus aureus*, when used in low concentrations.

It has now been found that certain N-phenyl derivatives of 4,6-dibromo-3-hydroxyphthalimide and 4,6-dibromo-3-acetoxyphthalimide do possess bacteriostatic properties against Gram positive organisms such as *Staph. aureus*.

Accordingly this invention provides a new class of compounds of the general formula

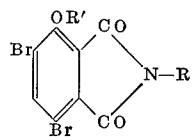

wherein R is selected from the class consisting of a phenyl group, a phenyl group substituted with from 1–3 bromine atoms, a phenyl group substituted with from 1–3 chlorine atoms, a phenyl group substituted with a fluorine atom, a phenyl group substituted with a trifluoromethyl group and a phenyl group substituted with a carbomethoxy group and $R^1$ is selected from the class consisting of hydrogen and the acetyl group.

Further, this invention provides a process for the preparation of compounds of the above defined general formula wherein R' is hydrogen which comprises the step of condensing a compound selected from the class consisting of 4,6-dibromo-3-hydroxyphthalic acid and 4,6-dibromo-3-hydroxyphthalic anhydride with a compound selected from the class consisting of aniline, an aniline substituted with from 1–3 bromine atoms, an aniline substituted with from 1–3 chlorine atoms, an aniline substituted with a trifluoromethyl group and an aniline substituted with a carbomethoxy group.

Certain of the compounds of the invention can also be prepared by condensing a compound selected from the class consisting of 3-hydroxyphthalic acid and 3-hydroxyphthalic anhydride with an appropriate aniline derivative as above defined and brominating the resulting condensate. However this process sometimes tends to give a mixture of differently substituted N-phenyl derivatives of 4,6-dibromo-3-hydroxyphthalimide.

The above condensation may also be carried out by refluxing equimolar portions of 4,6-dibromo-3-hydroxyphthalic acid or the corresponding anhydride and the appropriate aniline derivative in glacial acetic acid or in a high boiling solvent such as orthodichlorobenzene. Where orthodichlorobenzene is used the water evolved during the reaction is removed either as an azeotrope with the solvent or by addition of a dehydrating agent such as phosphorous trichloride or thionyl chloride to the reaction mixture.

4,6-dibromo-3-hydroxyphthalic acid, one of the main ingredients used in the formation of the novel compounds of this invention may be prepared in the following way. A solution of 21.1 g. (0.1 mole) 3-nitrophthalic acid in 170 ml. 5% aqueous sodium hydroxide solution is hydrogenated over 0.25 g. of a 5% w./w. palladium on charcoal mixture at 50° C. and 44 pounds per square inch. The resulting solution of 3-aminophthalic acid is made strongly acidic by the addition of 50% w./v. sulphuric acid and diazotized by the addition of sodium nitrite. The diazo solution thus formed is subsequently boiled to hydrolyse the diazonium salt. Ether extraction of the boiled solution after cooling yields 3-hydroxyphthalic acid. This isolation is however not necessary as the dibromo-acid can be obtained by adding bromine directly to the hydrolysed diazo solution.

15 g. (0.0825 mole) 3-hydroxyphthalic acid is dissolved in 200 ml. of distilled water and the solution cooled to 7° C. 26.5 g. (0.165 mole) bromine is added with stirring at such a rate as to maintain the temperature below 10° C. while the reaction mixture is illuminated with a 200 watt lamp. Crystals of 4,6-dibromo-3-hydroxyphthalic acid begin to separate during the latter stages of this addition. 4,6-dibromo-3-hydroxyphthalic anhydride may subsequently be obtained by sublimation of this dibromo acid at 205° C. and 10 mm. mercury. The dibromo-anhydride may also be formed by dehydrating the dibromo acid with thionyl chloride in an inert solvent.

N-aryl-4,6-dibromo-3-acetoxyphthalimides are most conveniently prepared by reacting the condensation products with acetic anhydride.

The invention is further illustrated by reference to the following examples.

EXAMPLE 1

0.02 mole 4,6-dibromo-3-hydroxyphthalic acid and 0.02 mole of the appropriate aniline derivative were refluxed together in the presence of 40 ml. orthodichlorobenzene. The water evolved during this reaction was removed by azeotropic distillation with the solvent until a clear yellow solution resulted. Greenish-yellow crystals separated on cooling the solution which could be recrystallised from glacial acetic acid.

| Aniline derivative | Product of reaction |
|---|---|
| m-Bromoaniline | N-(m-bromophenyl)-4,6-dibromo-3-hydroxyphthalimide. |
| Aniline | N-phenyl-4,6-dibromo-3-hydroxyphthalimide. |
| p-Bromoaniline | N-(p-bromophenyl)-4,6-dibromo-3-hydroxyphthalimide. |
| p-Chloroaniline | N-(p-chlorophenyl)-4,6-dibromo-3-hydroxyphthalimide. |

EXAMPLE 2

0.02 mole 4,6-dibromo-3-hydroxyphthalic acid and 0.02 mole of the appropriate aniline derivative were refluxed together in the presence of 50 ml. glacial acetic acid for 15 minutes. On cooling of this reaction solution a crystalline precipitate formed which was filtered, washed with water, dried in vacuo over sodium hydroxide and recrystallised from aqueous acetic acid.

| Aniline derivative | Product of the reaction |
|---|---|
| m-Chloroaniline | N-(m-chlorophenyl)-4,6-dibromo-3-hydroxyphthalimide. |
| o-Bromoaniline | N-(o-bromophenyl)-4,6-dibromo-3-hydroxyphthalimide. |
| p-Fluoroaniline | N-(p-fluorophenyl)-4,6-dibromo-3-hydroxyphthalimide. |
| m-Trifluoromethylaniline | N-(m-trifluoromethylphenyl)-4,6-dibromo-3-hydroxyphthalimide. |
| 2,5-dichloroaniline | N-(2',5'-dichlorophenyl)-4,6-dibromo-3-hydroxyphthalimide. |
| 3,4-dichloroaniline | N-(3',4'-dichlorophenyl)-4,6-dibromo-3-hydroxyphthalimide. |
| 2,4,5-trichloroaniline | N-(2',4',5'-trichlorophenyl)-4,6-dibromo-3-hydroxyphthalimide. |
| 3,5-dichloroaniline | N-(3',5'-dichlorophenyl)-4,6-dibromo-3-hydroxyphthalimide. |

EXAMPLE 3

Preparation of N-aryl-4,6-dibromo-3-acetoxyphthalimides 0.001 mole N-(m-bromophenyl)-4,6-dibromo-3-hydroxyphthalimide was refluxed in 10 ml. acetic anhydride for 30 minutes. The reaction mixture was cooled and poured into 125 ml. distilled water and stirred to hydrolyse the excess anhydride. The crude product was filtered, washed well with water, dried and recrystallised from aqueous acetone.

N-(m-chlorophenyl)-4,6-dibromo-3-acetoxyphthalimide and N-(p-bromophenyl)-4,6-dibromo-3-acetoxyphthalimide were prepared in similar manner.

EXAMPLE 4

Preparation of N-phenyl-4,6-dibromo-3-hydroxyphthalimide and N-(p-bromophenyl)-4,6-dibromo-3-hydroxyphthalimide 0.01 mole N-phenyl-3-hydroxyphthalimide was dissolved in 25 ml. methanol at 50° C. and 0.03 mole bromine was added dropwise with stirring while the reaction mixture was illuminated with a 200 watt light source. After the addition of the bromine the reaction mixture was stirred for a further half hour, during which period crystals of N-phenyl-4,6-dibromo-3-hydroxyphthalimide separated. These crystals were filtered and crystallised from aqueous acetic acid. Crystals of N-(p-bromophenyl)-4,6-dibromo-3-hydroxyphthalimide separated from the filtrate on standing.

All the above compounds have been found to have moderate bacteriostatic activity when tested for their minimum inhibitory concentration against *Staph. aureus* by the streak gradient plate technique, by the method described in an article by J. C. Curry in the Journal of Applied Microbiology (1963), Volume 11, No. 6, page 539.

What is claimed is:

1. A compound of the general formula

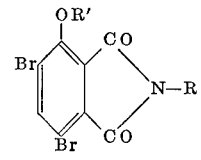

in which

R is selected from the class consisting of a phenyl group, a phenyl group substituted with from 1–3 bromine atoms, a phenyl group substituted with from 1–3 chlorine atoms, a phenyl group substituted with a fluorine atom, and a phenyl group substituted with a trifluoromethyl group R' is selected from the class consisting of hydrogen and the acetyl group.

References Cited

Carter et al., Chem. Abs. vol. 36, pp. 4108–09 (1942).
Noller, Chemistry of Organic Compounds, (1965), pp. 469, 552.

NICHOLAS S. RIZZO, Primary Examiner

J. A. NARCAVAGE, Assistant Examiner

U.S. Cl. X.R.
424—274